(12) United States Patent
Liu et al.

(10) Patent No.: US 11,630,560 B2
(45) Date of Patent: Apr. 18, 2023

(54) MAP INFORMATION DISPLAY METHOD AND APPARATUS, ELECTRONIC DEVICE, AND COMPUTER STORAGE MEDIUM

(71) Applicant: BEIJING BAIDU NETCOM SCIENCE AND TECHNOLOGY CO., LTD., Beijing (CN)

(72) Inventors: Wei Liu, Beijing (CN); Yingjie Niu, Beijing (CN); Fei Fang, Beijing (CN); Jingbo Fan, Beijing (CN); Xiying Wang, Beijing (CN); Junjie Huang, Beijing (CN); Yong Cui, Beijing (CN); Lusong Wang, Beijing (CN); Kailong Yan, Beijing (CN); Linlin Pan, Beijing (CN); Yang Zhang, Beijing (CN); Xueting Huo, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/374,136

(22) Filed: Jul. 13, 2021

(65) Prior Publication Data
US 2022/0019341 A1    Jan. 20, 2022

(30) Foreign Application Priority Data
Jul. 14, 2020    (CN) .......................... 202010673775.0

(51) Int. Cl.
*G06F 3/04845* (2022.01)
*G06N 20/00* (2019.01)
(Continued)

(52) U.S. Cl.
CPC ........ *G06F 3/04845* (2013.01); *G06F 3/0482* (2013.01); *G06N 20/00* (2019.01); *G01C 21/3682* (2013.01); *G06F 2203/04806* (2013.01)

(58) Field of Classification Search
CPC .. G06F 3/04845; G06F 3/0484; G06F 3/0482; G06F 3/0481; G06F 2203/04806;
(Continued)

(56) References Cited

U.S. PATENT DOCUMENTS 8,954,860 B1 * 2/2015 Hands .................... G06F 16/29
715/738
9,194,716 B1 * 11/2015 Cutter ................ G01C 21/3679
(Continued)

FOREIGN PATENT DOCUMENTS

CN    109189944 A  *  1/2019    .......... G06Q 10/047
CN    109189944 A       1/2019
(Continued)

OTHER PUBLICATIONS

Extended European Search Report of European Application No. 21164327.5 dated Sep. 9, 2021, 7 pages.

*Primary Examiner* — Reza Nabi
*Assistant Examiner* — Hwei-Min Lu
(74) *Attorney, Agent, or Firm* — Brooks Kushman P.C.

(57) ABSTRACT

The present application discloses a method for displaying map information and corresponding apparatus, electronic device, and computer storage medium, which relates to the fields of deep learning, knowledge graphs, and artificial intelligence. The method may include: when a user starts a map, acquiring a user feature of the user and historical click theme information of the user; for any to-be-recommended theme, determining a click probability of the to-be-recommended theme by using a pre-trained recommendation
(Continued)

model according to the user feature and the historical click theme information respectively; and displaying the to-be-recommended themes with the click probabilities meeting a predetermined requirement on the map. The efficiency of acquiring information through maps by users and the like can be improved by use of the solutions according to the present application.

11 Claims, 10 Drawing Sheets

(51) Int. Cl.
*G06F 3/0482* (2013.01)
*G01C 21/36* (2006.01)

(58) Field of Classification Search
CPC . G06N 20/00; G01C 21/3682; G01C 21/3679
USPC .......................................... 715/811, 810, 764
See application file for complete search history.

(56) References Cited

U.S. PATENT DOCUMENTS

| | | | | |
|---|---|---|---|---|
| 2002/0163547 | A1* | 11/2002 | Abramson | G06F 3/04812 715/855 |
| 2006/0267803 | A1* | 11/2006 | Mathis | G09B 29/106 340/995.15 |
| 2007/0143345 | A1* | 6/2007 | Jones | G06F 16/288 |
| 2011/0010650 | A1* | 1/2011 | Hess | G06F 3/04817 715/765 |
| 2011/0047509 | A1* | 2/2011 | Arrasvuori | G06F 16/29 706/54 |
| 2011/0122153 | A1* | 5/2011 | Okamura | G06F 16/58 345/629 |
| 2014/0026088 | A1* | 1/2014 | Monte | G06F 3/0488 715/765 |
| 2015/0169693 | A1 | 6/2015 | Stekkelpak | |
| 2016/0366545 | A1 | 12/2016 | Yamasaki et al. | |
| 2018/0349413 | A1* | 12/2018 | Shelby | G01C 21/3641 |
| 2019/0179917 | A1* | 6/2019 | Agrawal | G01C 21/3476 |
| 2020/0097564 | A1* | 3/2020 | Zhou | G06F 16/24578 |

FOREIGN PATENT DOCUMENTS

| | | | | |
|---|---|---|---|---|
| CN | 109977283 | A * | 7/2019 | ........... G06Q 10/047 |
| CN | 110555112 | A | 12/2019 | |
| JP | 2016053706 | A | 4/2016 | |
| JP | 2016532962 | A | 10/2016 | |
| JP | 2018049336 | A | 3/2018 | |
| JP | 2018077656 | A | 5/2018 | |
| JP | 2019113943 | A | 7/2019 | |
| JP | 2019125364 | A | 7/2019 | |
| JP | 2019185612 | A | 10/2019 | |
| JP | 2020102161 | A | 7/2020 | |
| WO | WO-2009055501 | A1 * | 4/2009 | ............. G06Q 30/02 |

* cited by examiner

US 11,630,560 B2

MAP INFORMATION DISPLAY METHOD AND APPARATUS, ELECTRONIC DEVICE, AND COMPUTER STORAGE MEDIUM

CROSS-REFERENCE TO RELATED APPLICATIONS

The present application claims the priority of Chinese Patent Application No. 202010673775.0, filed on Jul. 14, 2020, with the title of "Map information display method and apparatus, electronic device and computer storage medium." The disclosure of the above application is incorporated herein by reference in its entirety.

TECHNICAL FIELD

The present application relates to computer application technologies, and particularly to a method for displaying map information and corresponding apparatus, electronic device, and computer storage medium in the fields of deep learning, knowledge graphs, and artificial intelligence.

BACKGROUND

At present, when a user starts/opens a map, generally, only map information within a predetermined range around a geographical location of the user may be displayed, but other information cannot be actively recommended, thus reducing the efficiency of acquiring information through the map by the user.

SUMMARY

In view of this, the present application provides a method for displaying map information and corresponding apparatus, electronic device, and storage medium.

A method for displaying map information is provided, including when a user starts a map, acquiring a user feature of the user and historical click theme information of the user; for any to-be-recommended theme, determining a click probability of the to-be-recommended theme by using a pre-trained recommendation model according to the user feature and the historical click theme information respectively; and displaying the to-be-recommended themes with the click probabilities meeting a predetermined requirement on the map.

An electronic device is provided, including at least one processor; and a memory communicatively connected with the at least one processor; wherein the memory stores instructions executable by the at least one processor, and the instructions are executed by the at least one processor to enable the at least one processor to perform a method for displaying map information, wherein the method includes when a user starts a map, acquiring a user feature of the user and historical click theme information of the user, for any to-be-recommended theme, determining a click probability of the to-be-recommended theme by using a pre-trained recommendation model according to the user feature and the historical click theme information respectively; and displaying the to-be-recommended themes with the click probabilities meeting a predetermined requirement on the map.

There is also provided a non-transitory computer readable storage medium with computer instructions stored thereon, wherein the computer instructions are used for causing a computer to perform a method for displaying map information, wherein the method includes when a user starts a map, acquiring a user feature of the user and historical click theme information of the user; for any to-be-recommended theme, determining a click probability of the to-be-recommended theme by using a pre-trained recommendation model according to the user feature and the historical click theme information respectively; and displaying the to-be-recommended themes with the click probabilities meeting a predetermined requirement on the map.

One embodiment of the present application has the following advantages or beneficial effects: when a user starts a map, themes recommended to the user may be determined according to a user feature of the user and historical click theme information of the user, and the themes recommended to the user may be displayed on the map, so as to achieve personalized recommendation for different users, enrich the content displayed on the map, and improve the efficiency of acquiring information through the map by the users.

It shall be understood that the content described in this part is neither intended to identify key or important features of embodiments of the present disclosure and nor intended to limit the scope of the present disclosure. Other features of the present disclosure will be readily understood through the following specification.

BRIEF DESCRIPTION OF THE DRAWINGS

The accompanying drawings are intended to better understand the solution and do not constitute limitations on the present application. In the drawings.

DETAILED DESCRIPTION

Exemplary embodiments of the present application are described below with reference to the accompanying drawings, including various details of the embodiments of the present application to facilitate understanding, and should be considered as exemplary only. Therefore, those of ordinary skill in the art should be aware that various changes and modifications can be made to the embodiments described herein without departing from the scope and spirit of the present application. Similarly, for clarity and simplicity, descriptions of well-known functions and structures are omitted in the following description.

In addition, it shall be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
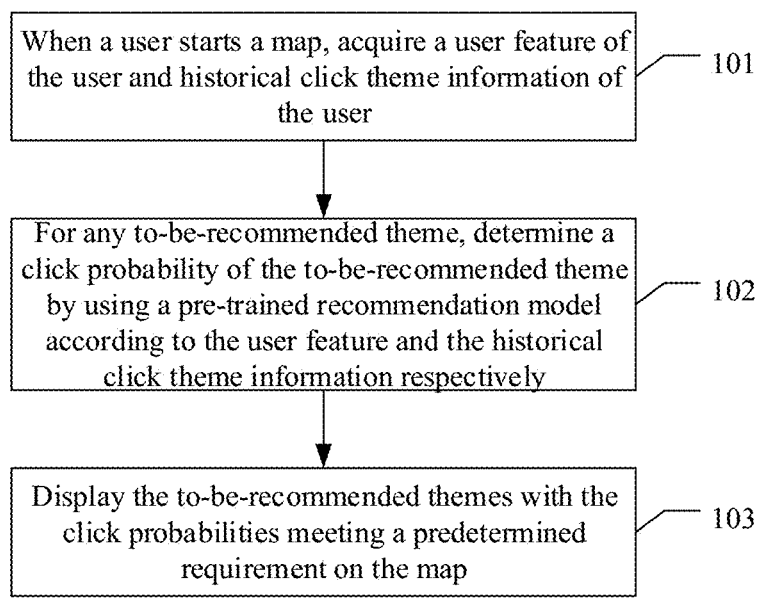
FIG. 1 is a flow chart of an embodiment of a method for displaying map information according to the present application.

FIG. 1 is a flow chart of an embodiment of a method for displaying map information according to the present application. As shown in FIG. 1, the method includes the following specific implementations.

In 101, when a user starts a map, a user feature of the user and historical click theme information of the user are acquired.

The historical click theme information of the user may refer to historical click theme information within a recent predetermined time length. A specific value of the predetermined time length may be determined according to an actual requirement, such as the recent half year. Historical click themes refer to themes clicked by the user historically.

In 102, for any to-be-recommended theme, a click probability of the to-be-recommended theme is determined by using a pre-trained recommendation model according to the user feature and the historical click theme information respectively.

The recommendation model may be pre-trained in a manner such as deep learning.

In 103, the to-be-recommended themes with the click probabilities meeting a predetermined requirement are displayed on the map.

That is, the to-be-recommended themes with the click probabilities meeting a predetermined requirement may be displayed on the map while the map is displayed.

It can be seen that in the above embodiment, when a user starts a map, themes recommended to the user may be determined according to a user feature of the user and historical click theme information of the user, and the themes recommended to the user may be displayed on the map, so as to achieve personalized recommendation for different users, enrich the content displayed on the map, and improve the efficiency of acquiring information through the map by the users.

In 101, the acquired user feature may include, but is not limited to, one or any combination of the following: user basic attribute information, user interest preference information, user historical behavior information, user geographical location information, and user scene information.

The user basic attribute information may refer to the user's gender, age (or age group), and the like. The user interest preference information may refer to user preference information such as what kind of food the user likes to eat and what the user likes to do. The user historical behavior information may refer to user past behavior information such as where the user has been. The user geographical location information may refer to a current geographical location of the user. The user scene information may refer to the user's current scene, such as near home, in a business circle, in the travel, or in a business trip.

What information is included in the user feature may be determined according to an actual requirement. How to acquire the user feature is the prior art. Themes matching the user's actual requirement can be recommended based on the acquired user feature, thereby improving the accuracy of recommendation results.

In addition to the user feature, the historical click theme information of the user may also be acquired, for example, historical click theme information of the user within a recent predetermined time length is acquired. In this way, as described in 102, for any to-be-recommended theme, a click probability of the to-be-recommended theme may be determined by using a recommendation model according to the acquired user feature and historical click theme information respectively.

The recommendation model is pre-trained and may be implemented based on a pre-constructed knowledge graph.

The knowledge graph may include different types of nodes, and the different types may include: entities and themes, each entity corresponding to a geographically existing point of interest (POI). For any entity, an entity node corresponding to the entity may be connected to a theme node corresponding to the theme to which the entity belongs respectively.

In actual application, corresponding knowledge graphs may be constructed for different cities respectively, and points of interest included in the cities are entities in the corresponding knowledge graphs. Moreover, a plurality of different themes and ownership relationships between entities and the themes may be predefined. One entity may belong to only one theme or a plurality of themes.

Figure 2:
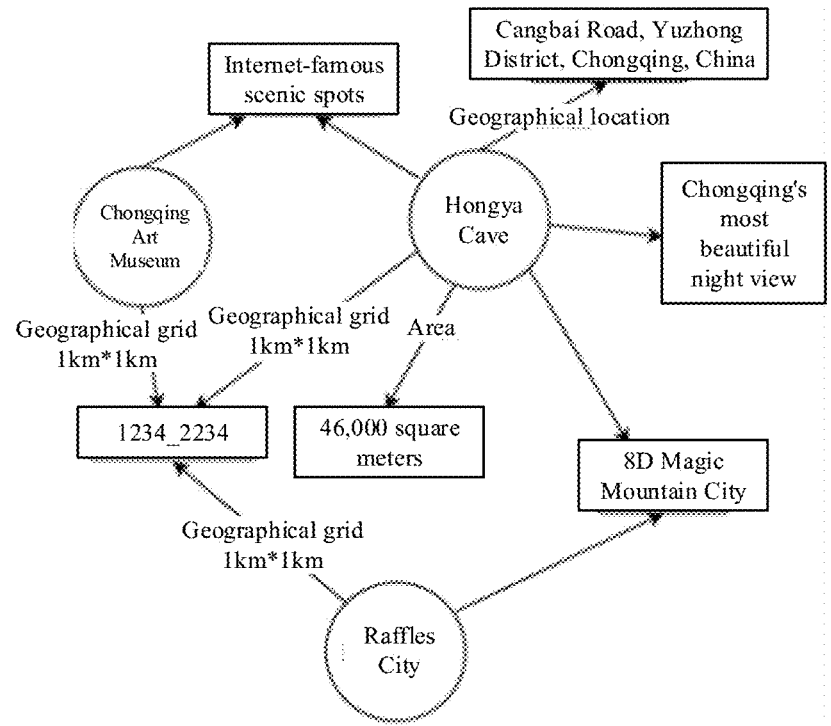
FIG. 2 is a schematic diagram of construction of a knowledge graph according to the present application.

FIG. 2 is a schematic diagram of construction of a knowledge graph according to the present application. As shown in FIG. 2, "Hongya Cave", "Chongqing Art Museum", and the like are entities, "Internet-famous scenic spots", "Chongqing's most beautiful night view", and the like are themes, and the entities such as "Hongya Cave" and "Chongqing Art Museum" belong to the theme "Internet-famous scenic spots". In addition, the entity "Hongya Cave" not only belongs to the theme "Internet-famous scenic spots", but also belongs to the themes such as "Chongqing's most beautiful night view" and "8D Magic Mountain City".

In addition to the entity nodes and the theme nodes, the constructed knowledge graph may further include some other types of nodes. For example, it may include, but is not limited to, geographical grid nodes. The geographical grid nodes are nodes of "1234_2234 (grid number)" as shown in FIG. 2.

For any entity, assuming that its coordinate is (11865005.26, 3426686.91), it may be divided exactly by 1000 to obtain a grid number of a calculated geographical grid to which the entity belongs: 11865_3426, and an entity node corresponding to the entity may be connected to a geographical grid node of "11865_3426". The same geographical grid node may be connected to a plurality of entity nodes, that is, a plurality of entities may be located in the same geographical grid node. As shown in FIG. 2, the entities such as "Chongqing Art Museum", "Hongya Cave", and "Raffles City" are all connected to the geographical grid node "1234_2234".

The entities and the themes may be well associated based on the constructed knowledge graph, so as to facilitate subsequent processing.

Further, vector representations of the entities in the knowledge graph may be determined respectively based on connection relationships among the different types of nodes in the knowledge graph in an existing manner, for example, through a semantic-based matching model. A specific implementation thereof is the prior art.

On the basis of the above, training data may be constructed based on historical click theme information and user features of different users, to train the recommendation model.

Upon completion of the training, the recommendation model may be configured for actual recommendation. As described above, for the user starting the map, click probabilities of the to-be-recommended themes may be determined by using the recommendation model according to the user feature of the user and the historical click theme information of the user. Specifically, a vector representation corresponding to the user feature may be acquired, vector representations corresponding to historical click themes in the historical click theme information and the to-be-recommended themes may be acquired respectively, and then the acquired vector representations may be inputted to the recommendation model, to obtain the click probabilities of the to-be-recommended themes output. The vector representations corresponding to the historical click themes and the to-be-recommended themes may be determined respectively according to the knowledge graph, and the historical click themes and the to-be-recommended themes are themes in the knowledge graph.

Figure 3:
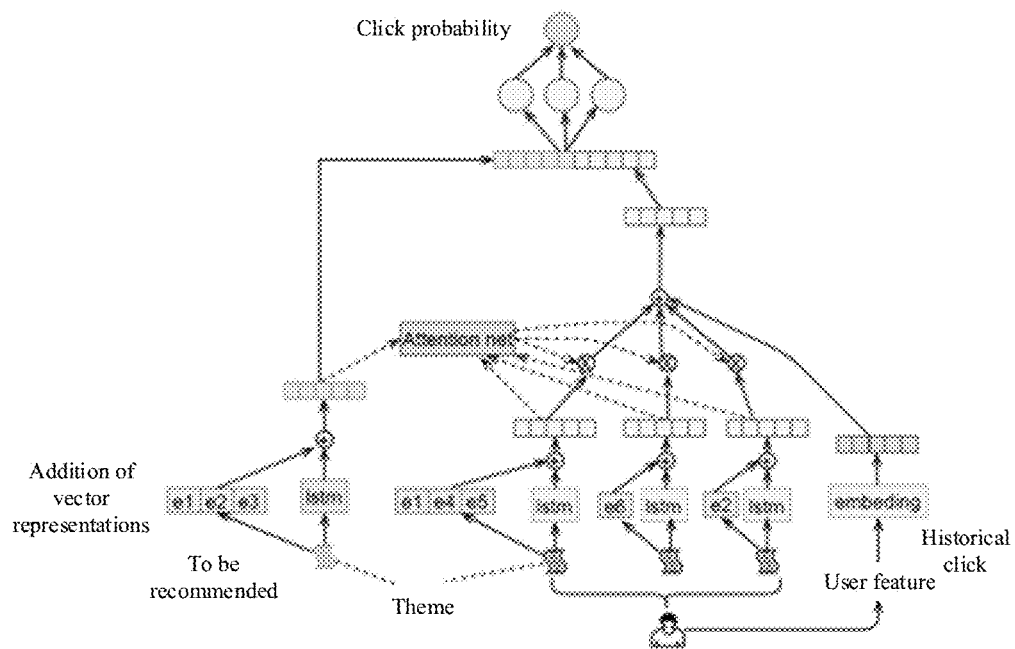
FIG. 3 is a schematic structural diagram of a recommendation model according to the present application.

FIG. 3 is a schematic structural diagram of a recommendation model according to the present application. As shown in FIG. 3, the user feature may be converted into a vector representation by embedding. For any theme in historical click themes and the to-be-recommended themes, the following processing may be performed respectively: converting the theme into a vector representation, for example, through a Long Short-Term Memory (LSTM) network, acquiring vector representations of entities belonging to the theme respectively, and then adding the vector representation obtained by conversion to the vector representations of the entities belonging to the theme, so as to obtain a vector representation corresponding to the theme. Taking the to-be-recommended theme shown in FIG. 3 as an example, the to-be-recommended theme may be converted into a vector representation through the LSTM (i.e., the lstm shown in the figure), vector representations, for example, e1, e2, and e3, of entities belonging to the to-be-recommended theme may be acquired respectively, which correspond to 3 entities belonging to the to-be-recommended theme respectively, and the vector representation obtained by conversion may be added to e1, e2, and e3, so as to obtain the vector representation corresponding to the to-be-recommended theme. For any theme, one or more entities belonging to the theme may be provided.

In addition, as shown in FIG. 3, vector representations corresponding to the historical click themes may be processed by using an attention net. That is, weights of the vector representations corresponding to the historical click themes may be determined respectively in combination with the vector representation corresponding to the to-be-recommended theme, the vector representations corresponding to the historical click themes may be multiplied by the corresponding weights, multiplication results and the vector representation corresponding to the user feature are added to obtain addition results, and then the addition results may be spliced with the vector representation corresponding to the to-be-recommended theme. A final click probability may be obtained after full connection. The processing of the attention net may be understood as follows: assuming that the historical click themes of the user are a theme a, a theme b, and a theme c, how much weight features of the theme a, the theme b, and the theme c account for in the model when the to-be-recommended theme is a theme d. By use of the attention net, a probability that the user clicks one/some themes and then may click the to-be-recommended theme may be learned.

Through the above processing, the click probability of the to-be-recommended theme can be conveniently and accurately acquired. For each to-be-recommended theme, the click probability may be acquired in the same manner. Then, as described in 103, the to-be-recommended themes with the click probabilities meeting a predetermined requirement may be displayed on the map. Preferably, the to-be-recommended themes with the click probabilities greater than a predetermined threshold may be displayed on the map in the form of bubbles. A specific value of the predetermined threshold may be determined according to an actual requirement. The display in the form of bubbles may facilitate the user to perform operations such as view and click.

Figure 4:
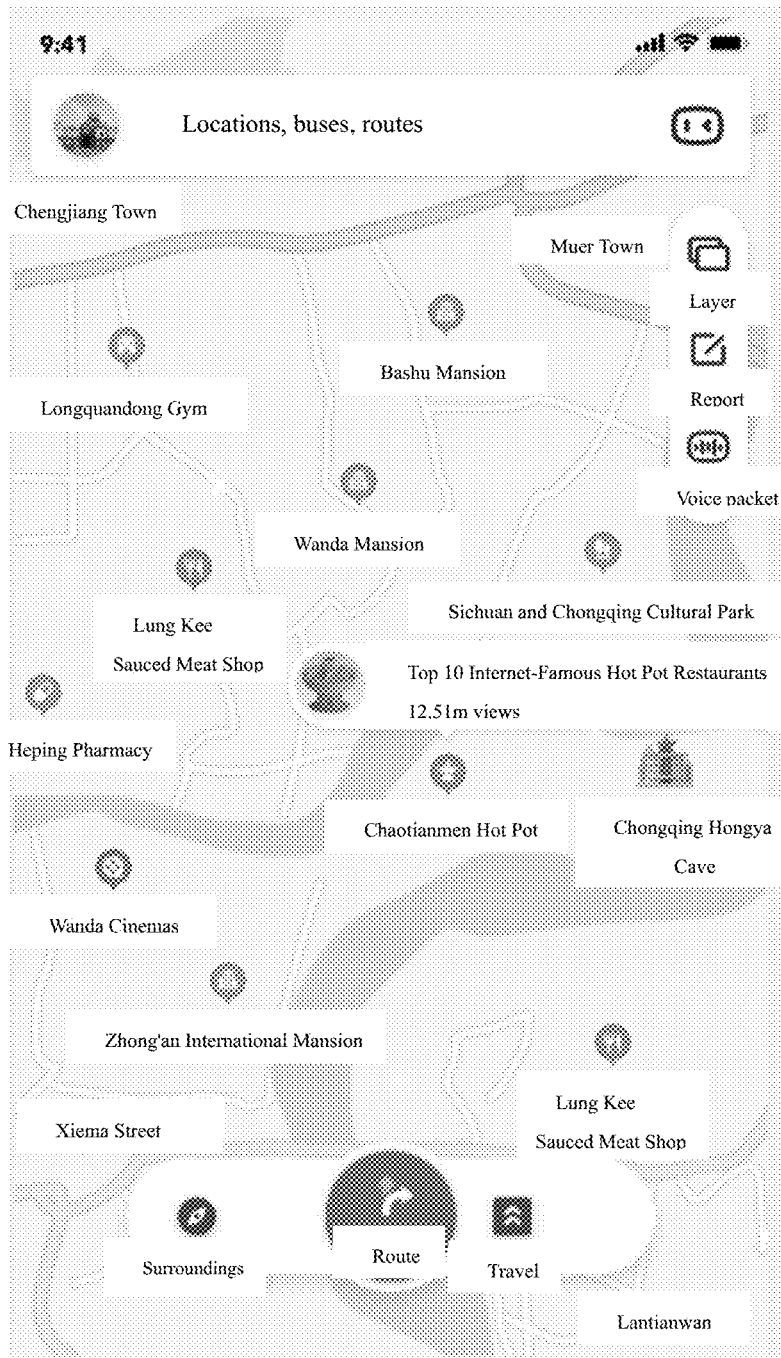
FIG. 4 is a schematic diagram of a manner of displaying a theme "Top 10 Internet-Famous Hot Pot Restaurants" recommended to a user according to the present application.

FIG. 4 is a schematic diagram of a manner of displaying a theme "Top 10 Internet-Famous Hot Pot Restaurants" recommended to a user according to the present application. As shown in FIG. 4, assuming that the user opens a map at 9:41 am and the user's interest preferences are like eating hot pot and taking photos, a theme recommended to the user may be "Top 10 Internet-Famous Hot Pot Restaurants".

Figure 5:
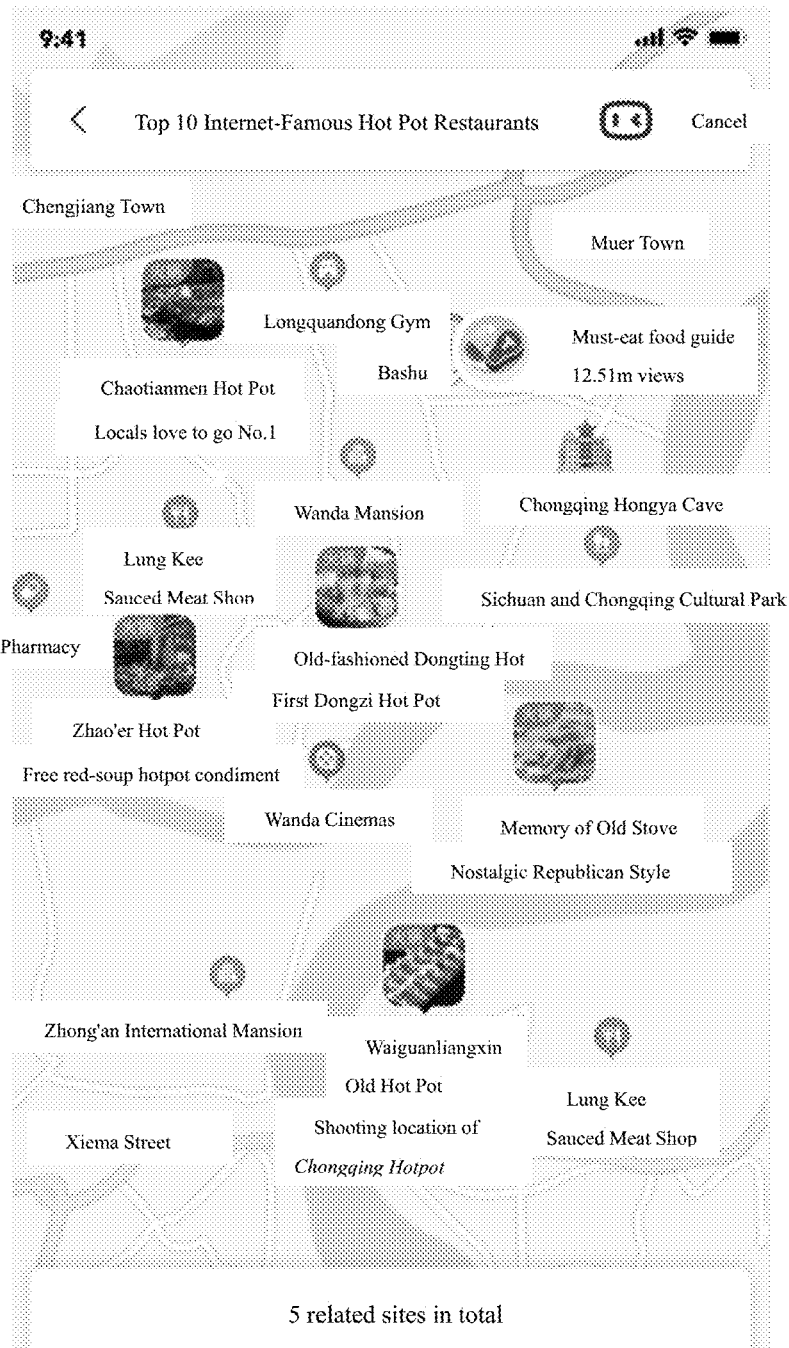
FIG. 5 is a schematic diagram of a display manner after a user clicks a bubble according to the present application.

When it is determined that the user clicks any of the displayed bubbles, entity information subordinate to a theme corresponding to the bubble may be displayed on the map. FIG. 5 is a schematic diagram of a display manner after a user clicks a bubble according to the present application. As shown in FIG. 5, after the user clicks the bubble of "Top 10 Internet-Famous Hot Pot Restaurants", corresponding content may be scattered in the drawing area. For example, entity information belonging to "Top 10 Internet-Famous Hot Pot Restaurants" such as "Old-fashioned Dongting Hot Pot", "Zhao'er Hot Pot", and "Memory of Old Stove" may be displayed, so that the user can quickly understand a plurality of entities and spatial distribution under the same theme. In addition, for each entity, a recommendation reason with a sentence may be displayed respectively to echo the corresponding theme, such as "First Dongzi Hot Pot" and "Nostalgic Republican Style", to facilitate the user to combine his own geographical location and interest preferences to make his own choice. If the user wants to go to a certain entity, the user can directly use the map for route planning and navigation, which is very convenient and efficient.

When it is determined that the user clicks any of the displayed entities, related content of the entity may also be displayed through preposition of a small panel and/or a detail page.

Figure 6:
FIG. 6 is a first schematic diagram of related content of displayed entities according to the present application.
Figure 7:
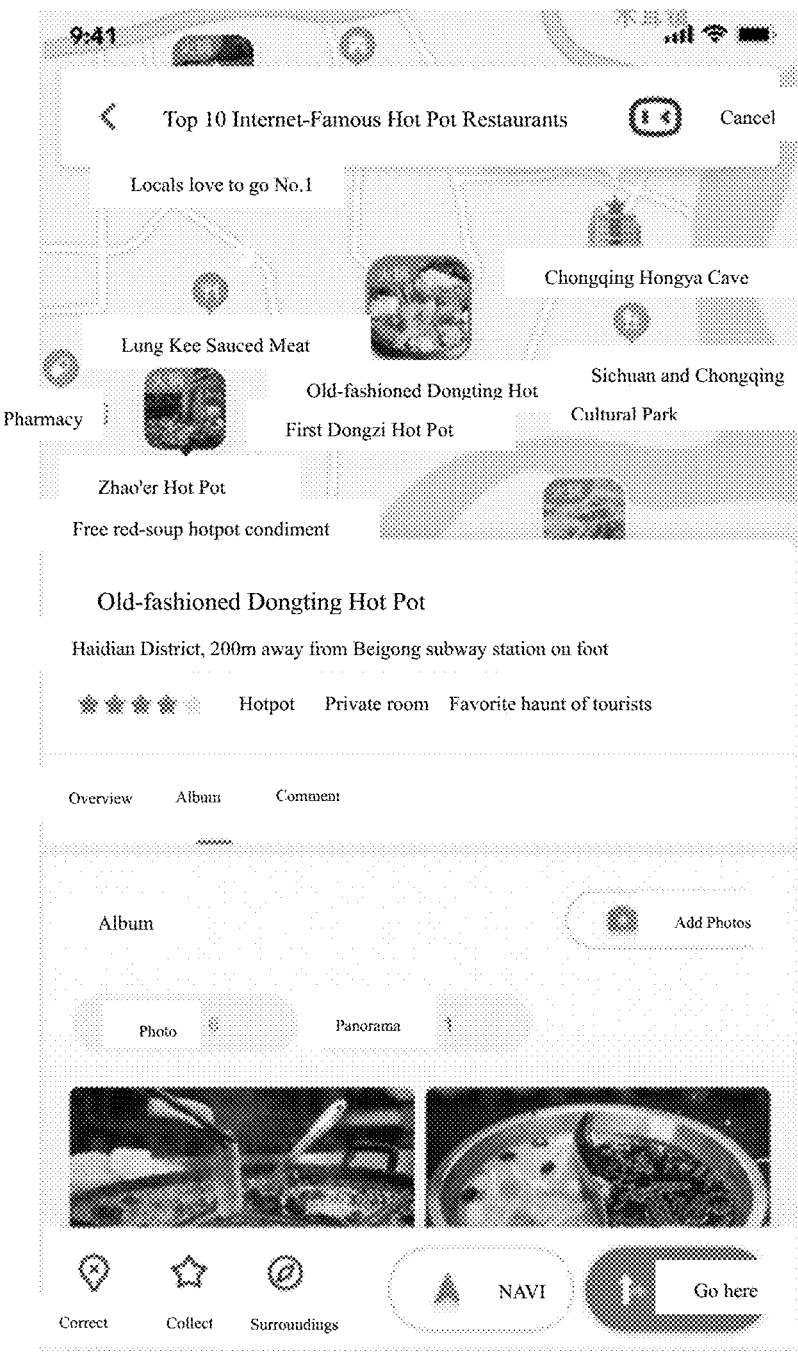
FIG. 7 is a second schematic diagram of related content of the displayed entities according to the present application.

FIG. 6 is a first schematic diagram of related content of displayed entities according to the present application. FIG. 7 is a second schematic diagram of related content of the displayed entities according to the present application. As shown in FIG. 6, assuming that the user clicks "Old-fashioned Dongting Hot Pot", related content of "Old-fashioned Dongting Hot Pot" may be displayed by preposition of a smaller panel (card preposition). Further, if the user clicks the related content displayed in FIG. 6, more content of "Old-fashioned Dongting Hot Pot" may also be displayed as shown in FIG. 7.

Through the above processing, the user can have a comprehensive understanding of the related content of the entities, so as to help the user to make a travel decision.

In addition, when it is determined that the user triggers any of the themes in a predetermined manner, entity information subordinate to the theme may also be displayed on the map.

Figure 8:
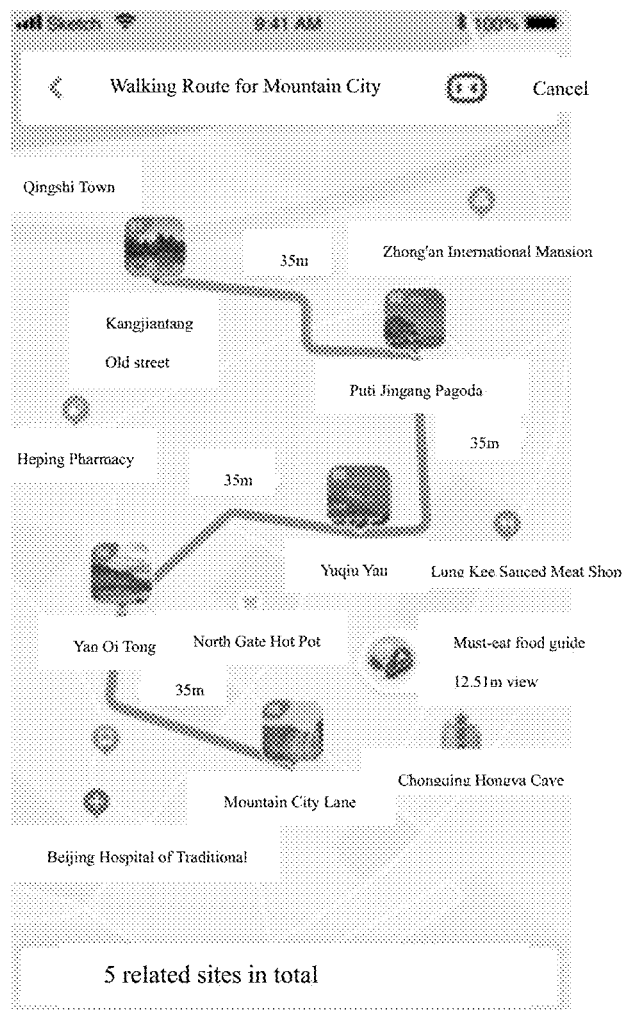
FIG. 8 is a schematic diagram of entity information corresponding to displayed "Footpath Walking Route for Mountain City" according to the present application.

The predetermined manner is not specifically limited. For example, the user searches on the map and inputs a theme of interest. Correspondingly, entity information subordinate to the theme may be displayed on the map. For example, the theme inputted by the user is "Top 10 Internet-Famous Hot Pot Restaurants", and then the content shown in FIG. 5 can be displayed. In another example, the theme inputted by the user is "Footpath Walking Route for Mountain City", and then entity information subordinate to the theme may be displayed in the manner shown in FIG. 8. FIG. 8 is a schematic diagram of entity information corresponding to displayed "Footpath Walking Route for Mountain City" according to the present application. As shown in FIG. 8, entities included on the footpath may be displayed, and information such as walking time between two adjacent entities may be displayed.

The predetermined manner may also refer to that the user searches on a mobile APP such as Baidu and inputs any theme, such as "Route of Tang Monk's Journey to the West", and then entity information subordinate to the theme may be displayed through a trigger operation of the user or automatic redirection. For example, entities included on the route of journey may be displayed, and information such as the full length of the route and countries passing throughout the journey, so as to make knowledge acquisition more efficient.

Thus, in the present application, when entity information subordinate to a theme is displayed, it is not limited to a trigger manner of clicking the to-be-recommended theme by the user, and may also be any other feasible trigger manners. The implementation manner is very flexible, and can meet requirements of different scenes.

The solution of the present application further supports increasing a map mode to various graphic guides to understand a specific geographical location with one click. In addition, the user may also create related content according to an actual requirement, and perform trip management and content sharing based on the map mode.

Moreover, when the user scales the map to different scales, the map may be displayed according to a visual effect display manner corresponding to a current scale. For example, geographical features, humanistic and historical features, regional customs, architectural styles, cultural atmospheres, and the like of cities may be displayed in different visual effect display manners, so that the user can understand characteristics of the cities by browsing the map, thereby further improving the efficiency of acquiring information through the map by the user.

Figure 9:
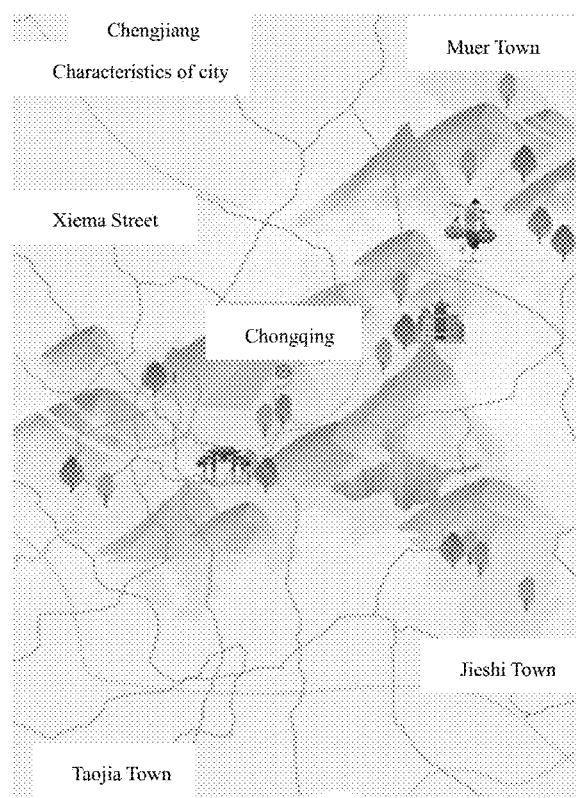
FIG. 9 is a first schematic diagram of map display manners under different scales according to the present application.
Figure 10:
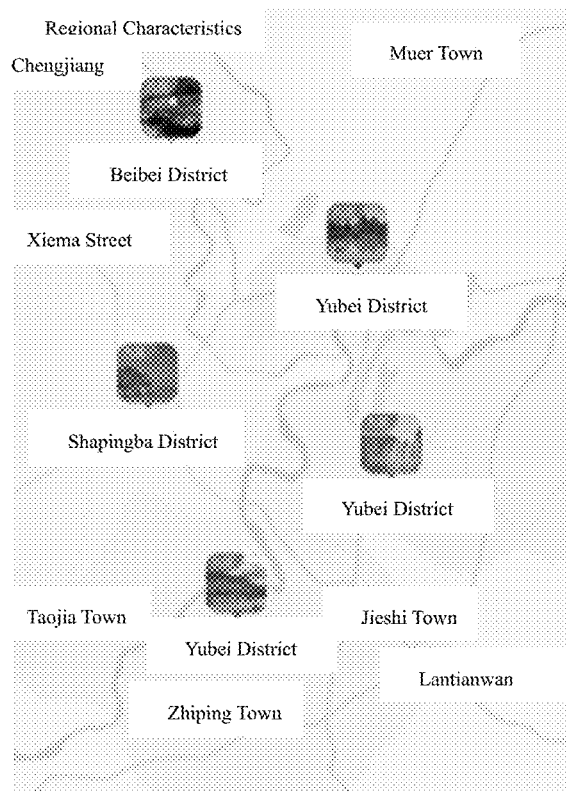
FIG. 10 is a second schematic diagram of map display manners under different scales according to the present application.

FIG. 9 is a first schematic diagram of map display manners under different scales according to the present application. FIG. 10 is a second schematic diagram of map display manners under different scales according to the present application. It can be seen that the two images correspond to different scales, and accordingly, visual effect display manners are also different.

It shall be noted that for ease of description, the foregoing method embodiment is described as a series of action combinations. However, those skilled in the art should understand that the embodiments of the present application are not limited to the sequence of actions described, as some steps may be performed in another sequence or simultaneously according to the present application. Next, those skilled in the art should also understand that the embodiments described in this specification all belong to preferred embodiments, and actions and modules involved are not necessarily mandatory to the present application.

The above is an introduction to the method embodiment, and the following is a further description of the solution according to the present application through an apparatus embodiment.

Figure 11:
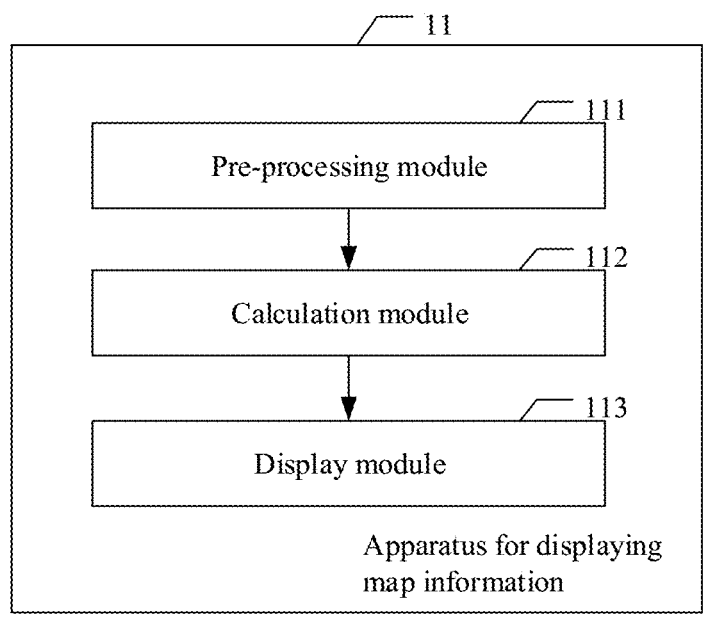
FIG. 11 is a schematic composite structure diagram of an embodiment of an apparatus 11 for displaying map information according to the present application.

FIG. 11 is a schematic structural diagram of components of an apparatus 11 for displaying map information according to the present application. As shown in FIG. 11, the apparatus includes: a calculation module 112 and a display module 113.

The calculation module 112 is configured to, when a user starts a map, acquire a user feature of the user and historical click theme information of the user, and for any to-be-recommended theme, determine a click probability of the to-be-recommended theme by using a pre-trained recommendation model according to the user feature and the historical click theme information respectively.

The display module 113 is configured to display the to-be-recommended themes with the click probabilities meeting a predetermined requirement on the map.

The historical click theme information of the user may refer to historical click theme information within a recent predetermined time length. A specific value of the predetermined time length may be determined according to an actual requirement, such as the recent half year. Historical click themes refer to themes clicked by the user historically.

The user feature may include, but is not limited to, one or any combination of the following: user basic attribute information, user interest preference information, user historical behavior information, user geographical location information, and user scene information.

The calculation module 112 may acquire a vector representation corresponding to the user feature and acquire vector representations corresponding to historical click themes in the historical click theme information and the to-be-recommended themes may be acquired respectively, and then may input the acquired vector representations to the recommendation model, to obtain the click probabilities of the to-be-recommended themes output.

As shown in FIG. 11, the apparatus may further include: a pre-processing module 111 configured to construct a knowledge graph. The knowledge graph may include different types of nodes, and the different types may include: entities and themes. Each entity corresponds to a geographically existing point of interest. For any entity, an entity node corresponding to the entity may be connected to a theme node corresponding to the theme to which the entity belongs respectively.

The calculation module 112 may determine vector representations corresponding to the historical click themes and the to-be-recommended themes respectively according to the knowledge graph, and the historical click themes and the to-be-recommended themes are themes in the knowledge graph.

The pre-processing module 111 may be further configured to acquire vector representations of the entities in the knowledge graph respectively. Correspondingly, the calculation module 112 may be configured to, for any theme in the historical click themes and the to-be-recommended themes, convert the theme into a vector representation, and add the vector representation obtained by conversion to the vector representation of the entity belonging to the theme, to obtain the vector representation corresponding to the theme.

Subsequently, the display module 113 may display the to-be-recommended themes with the click probabilities greater than a predetermined threshold on the map in the form of bubbles.

When it is determined that the user clicks any of the displayed bubbles, the display module 113 may also display entity information subordinate to a theme corresponding to the bubble on the map.

Further, when it is determined that the user clicks any of the displayed entities, the display module 113 may also display related content of the entity through preposition of a small panel and/or a detail page.

When it is determined that the user triggers any of the themes in a predetermined manner, the display module 113 may also display entity information subordinate to the theme on the map.

In addition, when the user scales the map to different scales, the display module 113 may also display the map according to a visual effect display manner corresponding to a current scale.

The specific workflow of the apparatus embodiment shown in FIG. 11 can be obtained with reference to the related description in the above method embodiment and is not repeated.

In conclusion, by use of the solution in the apparatus embodiment of the present application, when a user starts a map, themes recommended to the user may be determined according to a user feature of the user and historical click theme information of the user, and the themes recommended to the user may be displayed on the map, so as to achieve personalized recommendation for different users, enrich the content displayed on the map, and improve the efficiency of acquiring information through the map by the users.

According to embodiments of the present application, the present application further provides an electronic device and a readable storage medium.

Figure 12:
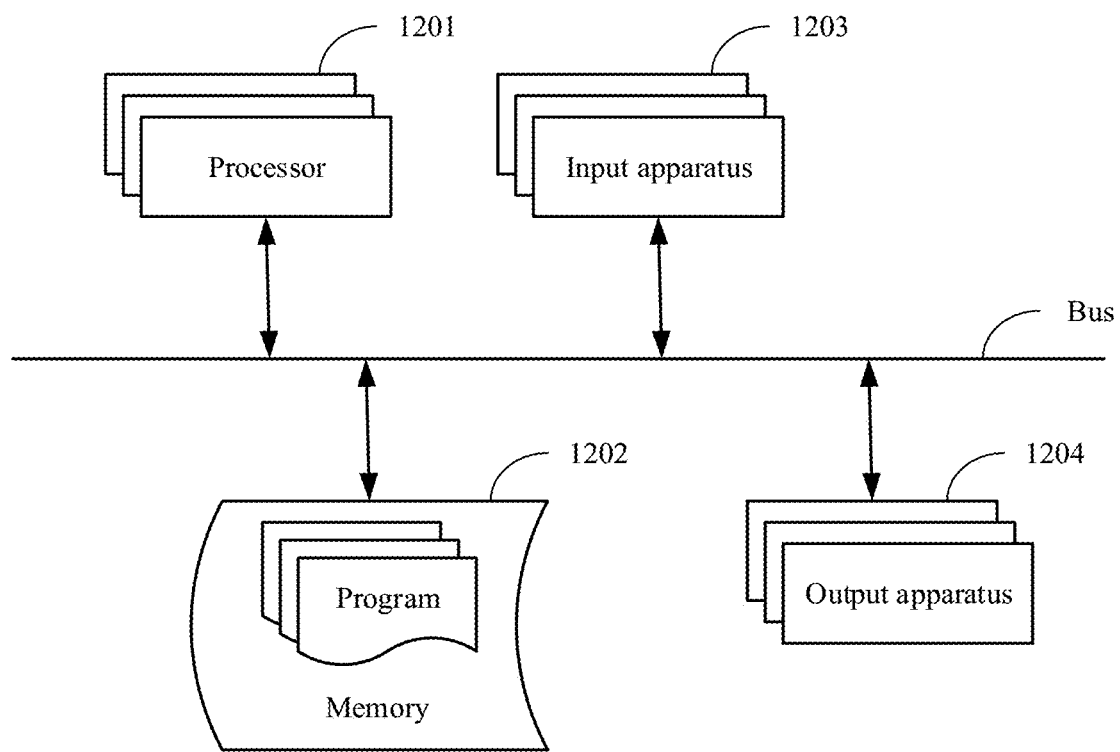
FIG. 12 is a block diagram of an electronic device for a method according to an embodiment of the present application.

FIG. 12 is a block diagram of an electronic device for a method according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 12, the electronic device includes: one or more processors 1201, a memory 1202, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 1201 is taken as an example is FIG. 12.

The memory 1202 is the non-instantaneous computer-readable storage medium according to the present application. The memory stores instructions executable by at least one processor to make the at least one processor perform the method according to the present application. The non-instantaneous computer-readable storage medium according to the present application stores computer instructions. The computer instructions are used to make a computer perform the method according to the present application.

The memory 1202, as a non-instantaneous computer-readable storage medium, may be configured to store non-instantaneous software programs, non-instantaneous computer executable programs and modules, for example, program instructions/modules corresponding to the method in the embodiment of the present application. The processor 1201 runs the non-instantaneous software programs, instructions and modules stored in the memory 1202 to execute various functional applications and data processing of a server, that is, to implement the method in the above method embodiment.

The memory 1202 may include a program storage area and a data storage area. The program storage area may store an operating system and an application required by at least one function; and the data storage area may store data created according to use of the electronic device. In addition, the memory 1202 may include a high-speed random access memory, and may further include a non-instantaneous memory, for example, at least one disk storage device, a flash memory device, or other non-instantaneous solid-state storage devices. In some embodiments, the memory 1202 optionally includes memories remotely disposed relative to the processor 1201. The remote memories may be connected to the electronic device over a network. Examples of the network include, but are not limited to, the Internet, intranets, blockchain networks, local area networks, mobile communication networks and combinations thereof.

The electronic device may further include: an input apparatus 1203 and an output apparatus 1204. The processor 1201, the memory 1202, the input apparatus 1203 and the output apparatus 1204 may be connected through a bus or in other manners. In FIG. 12, the connection through a bus is taken as an example.

The input apparatus 1203 may receive input numerical information or character information, and generate key signal input related to user setting and function control of the electronic device, for example, input apparatuses such as a touch screen, a keypad, a mouse, a trackpad, a touch pad, a pointer, one or more mouse buttons, a trackball, and a joystick. The output apparatus 1204 may include a display device, an auxiliary lighting apparatus and a tactile feedback apparatus (e.g., a vibration motor). The display device may include, but is not limited to, a liquid crystal display, a light-emitting diode display, and a plasma display. In some implementations, the display device may be a touch screen.

Various implementations of the systems and technologies described herein may be implemented in a digital electronic circuit system, an integrated circuit system, an application-specific integrated circuit, computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display apparatus (e.g., a cathode-ray tube or a liquid crystal display monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described herein can be implemented in a computing system including background components (for example, as a data server), or a computing system including middleware components (for example, an application server), or a computing system including front-end components (for example, a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network, a wide area network, a blockchain network, and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as cloud computing server or cloud host, which is a host product in the cloud computing service system to solve the problems of difficult management and weak business scalability in the traditional physical host and VPS service.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors.

Any modifications, equivalent substitutions and improvements made within the spirit and principle of the present application all should be included in the extent of protection of the present application.

What is claimed is:

1. A method for displaying map information, comprising:
   when a user starts a map, acquiring a user feature of the user and historical click theme information of the user;
   for each to-be-recommended theme of to-be-recommended themes, determining a click probability of the to-be-recommended theme by using a pre-trained recommendation model according to the user feature and the historical click theme information respectively; and
   displaying recommended themes with click probabilities meeting a predetermined requirement on the map,
   wherein the determining the click probability of the to-be-recommended theme by using the pre-trained recommendation model according to the user feature and the historical click theme information comprises:
      acquiring a vector representation corresponding to the user feature;
      acquiring vector representations corresponding to historical click themes in the historical click theme information and the to-be-recommended themes respectively; and
      inputting the acquired vector representation corresponding to the user feature and the acquired vector representations corresponding to the themes to the pre-trained recommendation model, to obtain the click probabilities of the to-be-recommended themes,
   the method further comprising:
      constructing a knowledge graph, the knowledge graph comprising different types of nodes, and the different types of nodes comprising: entities and themes, each entity corresponding to a geographically existing point of interest, and for the each entity, connecting an entity node corresponding to the each entity to a theme node corresponding to a theme to which the each entity belongs respectively; and
      the acquiring the vector representations corresponding to the historical click themes in the historical click theme information and the to-be-recommended themes respectively comprising: determining the vector representations corresponding to the historical click themes and the to-be-recommended themes respectively according to the knowledge graph, the historical click themes and the to-be-recommended themes being the themes in the knowledge graph,
   wherein the displaying the recommended themes with the click probabilities meeting the predetermined requirement on the map comprises: displaying the recommended themes with the click probabilities greater than a predetermined threshold on the map in the form of bubbles,
   the method further comprising:
      when the user selects one of the displayed bubbles, displaying information of entities subordinate to a theme corresponding to the selected bubble on the map,
      further comprising: when the user scales the map to different scales, displaying the information of the entities subordinate to the theme corresponding to the selected bubble on the map according to a visual effect display manner corresponding to a current scale, wherein two images correspond to different scales have different visual effect display manners, and the visual effect display manner relates to geographical features, humanistic and historical features, regional customs, architectural styles, and cultural atmospheres of cities on the map.

2. The method according to claim 1, further comprising: acquiring vector representations of the entities in the knowledge graph respectively; and the determining the vector representations corresponding to the historical click themes and the to-be-recommended themes according to the knowledge graph respectively comprising: for each theme in the historical click themes and the to-be-recommended themes, converting the each theme into a vector representation, and adding the vector representation obtained by conversion to a vector representation of an entity belonging to the each theme, to obtain the vector representation corresponding to the each theme.

3. The method according to claim 1, wherein the user feature comprises one or more of following: user basic attribute information, user interest preference information, user historical behavior information, user geographical location information, and user scene information.

4. The method according to claim 1, further comprising: when the user selects one of the entities of which the information is displayed, displaying related content of the selected entity through preposition of a small panel and/or a detail page.

5. The method according to claim 1, further comprising: when the user triggers one of the themes in a predetermined manner, displaying entity information subordinate to the triggered theme on the map.

6. An electronic device, comprising:
at least one processor; and
a memory communicatively connected with the at least one processor;
wherein the memory stores instructions executable by the at least one processor, and the instructions are executed by the at least one processor to enable the at least one processor to perform a method for displaying map information, wherein the method comprise:
when a user starts a map, acquiring a user feature of the user and historical click theme information of the user;
for each to-be-recommended theme of to-be-recommended themes, determining a click probability of the to-be-recommended theme by using a pre-trained recommendation model according to the user feature and the historical click theme information respectively; and
displaying recommended themes with click probabilities meeting a predetermined requirement on the map,
wherein the determining the click probability of the to-be-recommended theme by using the pre-trained recommendation model according to the user feature and the historical click theme information comprises:
acquiring a vector representation corresponding to the user feature;
acquiring vector representations corresponding to historical click themes in the historical click theme information and the to-be-recommended themes respectively; and
inputting the acquired vector representation corresponding to the user feature and the acquired vector representations corresponding to the themes to the pre-trained recommendation model, to obtain the click probabilities of the to-be-recommended themes,
the method further comprises:

constructing a knowledge graph, the knowledge graph comprising different types of nodes, and the different types of nodes comprising: entities and themes, each entity corresponding to a geographically existing point of interest, and for the each entity, connecting an entity node corresponding to the each entity to a theme node corresponding to a theme to which the each entity belongs respectively; and the acquiring the vector representations corresponding to the historical click themes in the historical click theme information and the to-be-recommended themes respectively comprising: determining the vector representations corresponding to the historical click themes and the to-be-recommended themes respectively according to the knowledge graph, the historical click themes and the to-be-recommended themes being the themes in the knowledge graph, wherein the displaying the recommended themes with the click probabilities meeting the predetermined requirement on the map comprises: displaying the recommended themes with the click probabilities greater than a predetermined threshold on the map in the form of bubbles, the method further comprises:
when the user selects one of the displayed bubbles, displaying information of entities subordinate to a theme corresponding to the selected bubble on the map, further comprising: when the user scales the map to different scales, displaying the information of the entities subordinate to the theme corresponding to the selected bubble on the map according to a visual effect display manner corresponding to a current scale, wherein two images correspond to different scales have different visual effect display manners, and the visual effect display manner relates to geographical features, humanistic and historical features, regional customs, architectural styles, and cultural atmospheres of cities on the map.

7. The electronic device according to claim 6, further comprising: acquiring vector representations of the entities in the knowledge graph respectively; and the determining the vector representations corresponding to the historical click themes and the to-be-recommended themes according to the knowledge graph respectively comprising: for each theme in the historical click themes and the to-be-recommended themes, converting the each theme into a vector representation, and adding the vector representation obtained by conversion to a vector representation of an entity belonging to the each theme, to obtain the vector representation corresponding to the each theme.

8. The electronic device according to claim 6, wherein the user feature comprises one or more of the following: user basic attribute information, user interest preference information, user historical behavior information, user geographical location information, and user scene information.

9. The electronic device according to claim 6, further comprising: when the user selects one of the entities of which the information is displayed, displaying related content of the selected entity through preposition of a small panel and/or a detail page.

10. The electronic device according to claim 6, further comprising: when the user triggers one of the themes in a predetermined manner, displaying entity information subordinate to the triggered theme on the map.

11. A non-transitory computer readable storage medium with computer instructions stored thereon, wherein the computer instructions are used for causing a computer to perform a method for displaying map information, wherein the method comprises:
- when a user starts a map, acquiring a user feature of the user and historical click theme information of the user;
- for each to-be-recommended theme of to-be-recommended themes, determining a click probability of the to-be-recommended theme by using a pre-trained recommendation model according to the user feature and the historical click theme information respectively; and
- displaying recommended themes with click probabilities meeting a predetermined requirement on the map, wherein the determining the click probability of the to-be-recommended theme by using the pre-trained recommendation model according to the user feature and the historical click theme information comprises:
- acquiring a vector representation corresponding to the user feature;
- acquiring vector representations corresponding to historical click themes in the historical click theme information and the to-be-recommended themes respectively; and
- inputting the acquired vector representation corresponding to the user feature and the acquired vector representations corresponding to the themes to the pre-trained recommendation model, to obtain the click probabilities of the to-be-recommended themes, the method further comprising:
- constructing a knowledge graph, the knowledge graph comprising different types of nodes, and the different types of nodes comprising: entities and themes, each entity corresponding to a geographically existing point of interest, and for the each entity, connecting an entity node corresponding to the each entity to a theme node corresponding to a theme to which the each entity belongs respectively; and
- the acquiring the vector representations corresponding to the historical click themes in the historical click theme information and the to-be-recommended themes respectively comprising: determining the vector representations corresponding to the historical click themes and the to-be-recommended themes respectively according to the knowledge graph, the historical click themes and the to-be-recommended themes being the themes in the knowledge graph, wherein the displaying the recommended themes with the click probabilities meeting the predetermined requirement on the map comprises: displaying the recommended themes with the click probabilities greater than a predetermined threshold on the map in the form of bubbles, the method further comprising:
- when the user selects one of the displayed bubbles, displaying information of entities subordinate to a theme corresponding to the selected bubble on the map,
- further comprising: when the user scales the map to different scales, displaying the information of the entities subordinate to the theme corresponding to the selected bubble on the map according to a visual effect display manner corresponding to a current scale, wherein two images correspond to different scales have different visual effect display manners, and the visual effect display manner relates to geographical features, humanistic and historical features, regional customs, architectural styles, and cultural atmospheres of cities on the map.

* * * * *